United States Patent [19]

Okane et al.

[11] Patent Number: 4,541,617

[45] Date of Patent: Sep. 17, 1985

[54] LANCE STRUCTURE FOR OXYGEN-BLOWING PROCESS IN TOP-BLOWN CONVERTERS

[75] Inventors: Kohji Okane; Hidemasa Nakajima; Shozo Okamura; Masanobu Sueyasu, all of Osaka; Takashi Managa, Kashima, all of Japan

[73] Assignee: Sumitomo Metal Industries, Osaka, Japan

[21] Appl. No.: 487,566

[22] Filed: Apr. 22, 1983

[30] Foreign Application Priority Data

Apr. 23, 1982 [JP] Japan .................................. 57-69379

[51] Int. Cl.[4] .................................. B23K 37/04

[52] U.S. Cl. .................................. 266/65; 75/51.6; 75/51.5

[58] Field of Search ................ 75/52, 59, 60; 266/265

[56] References Cited

U.S. PATENT DOCUMENTS

| | | | |
|---|---|---|---|
| 2,991,173 | 7/1961 | Trentini | 75/60 |
| 3,078,084 | 2/1963 | Foresi | 75/60 |
| 3,771,998 | 11/1973 | Knuppel | 75/52 |
| 3,793,002 | 1/1974 | Borgnat | 75/60 |
| 3,953,199 | 4/1976 | Michaelis | 75/60 |
| 4,243,211 | 1/1981 | Leroy | 75/60 |

*Primary Examiner*—Peter D. Rosenberg
*Attorney, Agent, or Firm*—Burns, Doane, Swecker & Mathis

[57] ABSTRACT

Herein disclosed is a lance structure for use with a top-blown converter. The lance structure is constructed to include a cylindrical sheath having a bottom wall and a flux supply tube disposed at the center of the sheath and defining a passage for carrying slag-forming flux in a powdered form. Further inclusive are a plurality of oxygen supply tubes which are arranged in the sheath and around the flux supply tube and which define oxygen supply passages. From the oxygen supply tubes, there lead a corresponding number of Laval nozzles which have their exits opened in the sheath bottom so that the oxygen gas supplied through the oxygen supply passages may be blown in the form of supersonic jets to penetrate into the molten iron contained in the converter. The flux supply tube is formed with ports which are opened into the Laval nozzles just upstream of the exits thereof to feed the flux together with a carrier gas to the supersonic oxygen jets so that the carrier gas flows may merge into the oxygen jets. Thus, the powdered flux can be uniformly dispersed in the oxygen jets without wearing and damaging the inner walls of the Laval nozzles and can be carried by the jets deeply into the molten iron.

12 Claims, 5 Drawing Figures

LANCE STRUCTURE FOR OXYGEN-BLOWING PROCESS IN TOP-BLOWN CONVERTERS

BACKGROUND OF THE INVENTION

1. Field of the Invention

The present invention relates to a top-blown converter and, more particularly, to both a lance structure, which is to be used with the top-blown converter for blowing oxygen from the top into molten iron contained in the converter thereby to refine the molten iron into steel, and a process for blowing oxygen together with slag-forming flux in a powdered form into the molten iron.

2. Description of the Prior Art

In the oxygen top-blown steel making technique, as is well known in the art, slag-forming agent or flux is added to react with the impurities contained in pig iron so that slag may be formed to effectively promote dephosphorization. In accordance with that steel making technique, moreover, a refining coverter is charged with the pig iron, scrap and a sub-material, and an oxygen gas is blown to penetrate into the converter from an oxygen lance so that the pig iron may be refined into steel. Here, if the sub-material, i.e., the slag-forming flux such as quicklime, fluorite, dolomite or iron ore is in a powdered form, it will be scattered by the carbon monoxide gas generated as a result of the refining reaction. In order to prevent this, the converter is charged with the slag-forming flux in an agglomerated form. Nevertheless, it is still difficult to completely melt the quicklime or lime stone within a blowing time period thereby to promote formation of the slag because the quicklime or lime stone is composed mainly of CaO having a high melting point of about 2570 C. In other words, it is difficult to form the slag thereby to effectively promote dephosphorization and desulphurization.

In order to eliminate that difficulty, there has been developed the so-called "LD-AC process (or OLP process)". According to this process, the quicklime powder acting as the slag-formed flux is premixed with the oxygen gas so that it may be carried by the oxygen gas to penetrate into the top surface of the molten iron contained in the converter. This process is advantageous in that the flux can be scattered in the oxygen gas flow and can be carried to penetrate directly into a fire point which is formed by the oxygen jet. As a result, the flux is promptly heated by the molten iron to react with the impurities in the iron so that the slag is formed to promote the dephosphorization and desulphurization. However, since the quicklime powder premixed with the oxygen will wear and damage a Laval nozzle which is used to generate a supersonic jet of the oxygen gas for increasing the depth of penetration, the velocity of the oxygen jet is dropped to produce a so-called "soft blow". As a result, much FeO is formed, and slopping phenomena frequently occur to make the running operations difficult or drop the production yield. Moreover, the lance lifetime is considerably shortened. Hence, the process of the prior art has not been put into actual practice partly because there is required a system for premixing the flux powder with the oxygen gas flow under a high pressure so that the cost for the facilities inclusive is raised and partly because the steel making efficiency of the process is not satisfactory.

In order to overcome those disadvantages of the foregoing process, there has also been proposed a process in which the oxygen lance is equipped with a flux feeding nozzle in addition to the oxygen nozzle so that the oxygen jet injected from the oxygen nozzle may cross, downstream of the lance, the slag-forming flux spurting from the flux feeding nozzle together with the carrier gas and may be blown into the molten iron. Nevertheless, the process thus proposed in the art is effective to prevent the Laval nozzle of the oxygen lance from being worn. In case the process is applied to a large-sized converter, the carrier gas has to be fed at a flow rate sufficient for effectively dispersing the powder in the oxygen gas jet so that the cost for the piping system of the converter is raised to a remarkably high level. In case the existing converter is to have its construction changed, on the other hand, the process under consideration is liable to be restricted in its facilities. If the oxygen gas jet is directed to cross the carrier gas jet carrying the slag-forming flüx, the blowing operation has a tendency to become "hard", as is well known in the art, so that spitting phenomena become so intense as to cause loss of the iron material itself.

SUMMARY OF THE INVENTION

With the background thus far described, the present invention has been conceived to solve the aforementioned problems encountered by the oxygen top-blown steel making technique of the prior art.

It is, threfore, an object of the present invention to provide a novel technique for efficiently forming slag by the use of inexpensive facilities so that the refining process may be stably effected.

Another major object of the present invention is to provide a novel lance structure which is to be used with a top-blown converter for blowing oxygen from the top into molten iron contained in the converter thereby to refine the molten iron efficiently and stably into steel.

Still another object of the present invention is to provide a novel process for blowing oxygen together with slag-forming flux in a powdered form from the top into molten iron in the top-blown converter thereby to refine the molten iron efficiently and stably into steel.

According to one feature of the present invention, there is provided a lance structure to be used with a top-blown converter for blowing oxygen from the top into molten iron contained in the converter thereby to refine the molten iron into steel, said lance structure comprising: a sheath having a generally cylindrical side wall and a blinded bottom wall; a generally cylindrical flux supply tube disposed coaxially in said sheath and having its bottom wall blinded and spaced from the bottom wall of said sheath, said flux supply tube defining a powdered flux supply passage for carrying slag-forming, powdered flux therethrough in a carrier gas and supplying the powdered flux to supersonic jets of an oxygen gas; a generally cylindrical oxygen supply tube disposed coaxially in said sheath and around said flux supply tube and having its bottom wall blinded and spaced from the bottom wall of said sheath, said oxygen supply tube defining an annular oxygen supply passage for supplying the oxygen gas; a plurality of Laval nozzles leading from said oxygen supply tube and disposed in the bottom wall of said oxygen supply tube substantially equi-angularly on the axis of said sheath, said Laval nozzles having their exits opening in the bottom wall of said sheath for blowing the oxygen gas in the form of the supersonic jets into the molten iron in said top-blown converter, said flux supply tube being formed with a plurality of flux feeding ports which open into said Laval nozzles just upstream of the exits thereof to feed the powdered flux together with the carrier gas to the supersonic oxygen gas jets so that the carrier gas flows may merge into the supersonic oxygen gas jets, whereby the powdered flux fed can be uniformly dispersed in the supersonic oxygen gas jets and carried by the same into the molten iron in said top-blown converter; and a water jacket formed in the space of said sheath around said oxygen supply tube and said Laval nozzles and supplied with cooling water in a circulating manner for cooling down the side and bottom walls of said sheath and the exits of said Laval nozzles.

According to another feature of the present invention, there is provided a process for blowing oxygen together with slag-forming, powdered flux from the top into molten iron contained in a top-blown converter thereby to refine the molten metal into steel, said process comprising the steps of: injecting an oxygen gas in the form of supersonic jets toward the molten iron by means of a plurality of Laval nozzles; and feeding the powdered flux together with a carrier gas to the supersonic oxygen gas jets just upstream of the exits of said Laval nozzles, simultaneously with the injecting step, so that the carrier gas flows may merge into the supersonic oxygen gas jets, whereby the powdered flux fed can be uniformly dispersed in the supersonic oxygen gas jets and carried by the same into the molten iron in said top-blown converter.

BRIEF DESCRIPTION OF THE DRAWINGS

Other objects, features and advantages of the present invention will become more apparent from the following description taken in conjunction with the accompanying drawings, in which.

DESCRIPTION OF THE PREFERRED EMBODIMENT

Figure 1:
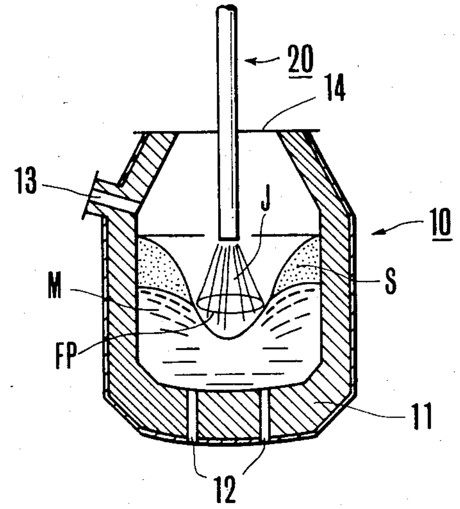
FIG. 1 is a longitudinal section showing an oxygen top-blown converter to which the present invention is applied.

Referring first to FIG. 1, there appears a top-blown converter, as indicated generally at reference numeral 10, which is constructed of a refractory wall 11. The space defined by this wall 11 is charged with molten iron M which is to be refined into steel. Indicated generally at reference numeral 20 is a lance which is adapted to be moved vertically in an upright position toward and away from the top surface of the molten iron M. The refining operation according to the present invention is conducted by injecting an oxygen gas in the form of a surpersonic jet J together with slag-forming flux into the molten iron M. As the refining process proceeds, a fire point FP is formed on the surface of the molten iron M, into which the supersonic oxygen jet J is blown, and slag S is formed to float on the molten iron surface. Simultaneously with this top blowing operation, an inert gas such as argon may be blown into the molten iron M from the converter bottom through bottom-blowing nozzles 12 which are formed in the bottom wall of the converter 10. When the refining process is completed, the converter 10 is first tilted to remove the slag S out of a slag outlet 13 and then is further tilted to allow the refined steel product to flow out of the top 14 of the converter 10.

Figure 2:
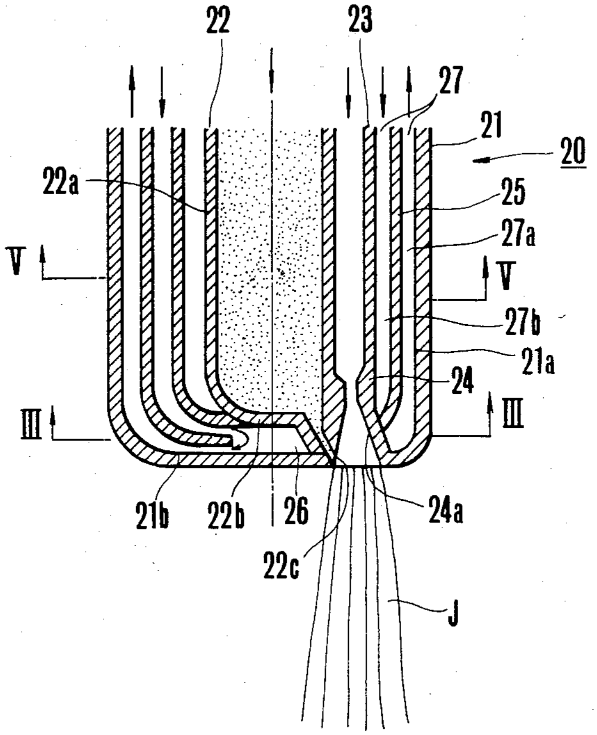
FIG. 2 is an enlarged longitudinal section showing a four-walled lance according to the present invention.
Figure 3:
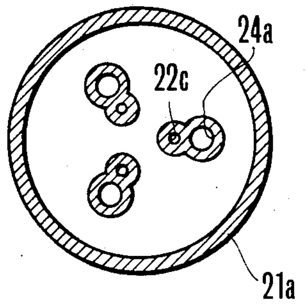
FIG. 3 is transverse section taken along line 3—3 of FIG. 2.
Figure 4:
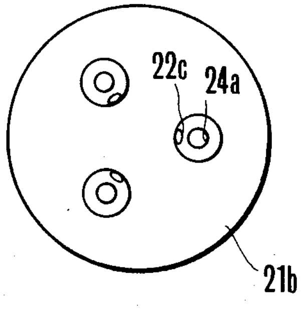
FIG. 4 is a bottom view showing the lance of FIGS. 2 and 3.
Figure 5:
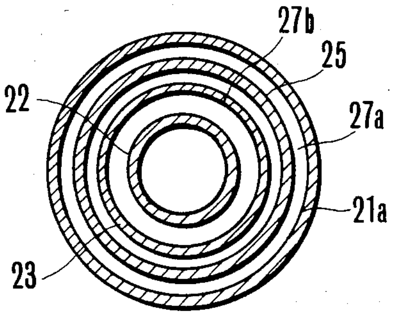
FIG. 5 is also a transverse section but is taken along line 5—5 of FIG. 2.

Turning now to FIG. 2, the lance 20 according to the present invention will be described in more detail in the following. The lance 20 has a four-walled structrure which is generally constructed of a sheath 21, a flux supply tube 22, an oxygen supply tube 23 leading to three Laval nozzles 24, and a partition 25. As better seen from FIGS. 3 and 5, radially inner wall portions of the oxygen supply tube 23 and the Laval nozzles 24 may be made integral with the radially outer wall portions of the flux supply tube 22. Reverting to FIG. 2, the sheath 21 is formed with a generally cylindrical side wall 21*a* and a blinded bottom wall 21*b*. The flux supply tube 22 also has a generally cylindrical shape and is disposed at the center of the lance 20 such that its side wall 22*a* extends coaxially in the side wall 21*a* of the sheath 21. The bottom wall 22*b* of the flux supply tube 22 is also blinded, as shown, and is spaced from the bottom wall 21*b* of the sheath 21 thereby to form a bottom water jacket 26. This bottom water jacket 26 has a relatively complex water passage, which is not described in detail because it does not directly relate to the gist of the present invention. The flux supply tube 22 defines a powdered flux supply passage for carrying a slag-forming, powdered flux therethrough in a carrier gas such as oxygen and for supplying the powdered flux to supersonic jets J of an oxygen gas. Incidentally, the powdered flux may contain at least one selected from the group consisting of quicklime, fluorite, dolomite and iron ore. On the other hand, oxygen supply tube 23 has a generally cylindrical form and is disposed coaxially in the sheath 21 and around the flux supply tube 22. Moreover, the flux supply tube 22 has its bottom wall blinded and spaced from the bottom wall 21*b* of the sheath 21. As better seen from FIGS. 3 to 5, the Laval nozzles 24 may be spaced by an equal angle of 120 degrees from one another. The number of those nozzles 24 may be arbitrary depending upon the design requirements. In either event, the oxygen supply tube 23 thus arranged defines an annular oxygen supply passage for supplying the oxygen gas.

On the other hand, the Laval nozzles 24 are constructed to lead downward from the oxygen supply tube 23 and are disposed in the bottom wall of the oxygen supply tube 23 substantially equi-angularly on the axis of the sheath 21. Moreover, the Laval nozzles 24 have their exits 24*a* opening in the bottom wall 21*b* of the sheath 21 for blowing the oxygen gas in the form of the supersonic jets to penetrate deeply into the molten iron contained in the top-blown converter. Here, it should be noted that the flux supply passage 22 is formed with three flux feeding ports 22*c* which open into the Laval nozzles 24 just upstream of the exits 24*a* to feed the powdered flux together with the carrier gas to the supersonic oxygen jets J. With closer reference to FIGS. 2 and 4, the flux feeding ports 22*c* of the flux supply tube 22 open at an acute angle with respect to the flow directions of the supersonic oxygen gas jets J and in the radially innermost positions of the diverging walls of the Laval nozzles 24. That acute angle may be determined at a suitable value by taking the supersonic characteristics of the flow pattern such as separation of the flows, generation of shock waves or formation of slip flows into consideration.

A side water jacket 27 is also formed in the space of the sheath 21 around the oxygen supply tube 23 and the Laval nozzles 24 and are supplied with cooling water in a circulating manner for cooling down the side and bottom walls 21*a* and 21*b* of the sheath 21 and the exits 24*a* of the Laval nozzles 24. The side water jacket 27 is divided generally into an outer side jacket 27*a* and an inner side jacket 27*b* by means of the partition 25 which also has a generally cylindrical shape. This partition 25 is also disposed coaxially in the sheath 21 around the oxygen supply tube 23 and the Laval nozzles 24. As a result, the cooling water introduced into the inner side jacket 27*b* is discharged out of the outer side jacket 27*a* so that it can circulate throughout the side water jacket 27 by way of the aforementioned bottom water jacket 26.

With the lance 20 having the construction thus far described, the powdered flux fed from the flux feeding ports 22*c* can be mixed with the supersonic oxygen gas jets J and blown into the molten iron. More specifically, the carrier gas flows spurting from the flux feeding ports 22*c* of the flux supply tube 22 can merge into the supersonic oxygen gas jets J so that the powdered flux can be uniformly dispersed in the oxygen gas jets J and carried by the jets J to penetrate deeply into the molten iron contained in the top-blown converter. As a result, the slag-forming flux in the powdered form can be sufficiently mixed with the oxygen gas jets J and blown into the fire point of the molten iron without any requirement for boosting the pressure prevailing in the flux supply system. Thus, the lance 20 of the present invention should be appreciated in that not only the flux supply tube 22 but also the flux feeding ports 22*c* are less worn than in the prior art so that the lance 20 itself can enjoy an elongated lifetime.

The present invention will be described in the following in connection with one Example thereof so that its advantages over the prior art may be more clearly understood.

EXAMPLE

The top-blown converter used in the Example had a capacity of 15 tons and was of composite blown type which was equipped at its bottom with two bottom-blowing nozzles having an internal diameter of 12.7 mm in addition to the oxygen lance of the present invention. The top-blowing lance used was of four-walled type which had the construction shown in FIGS. 2 to 5. Specifically, the Laval nozzles 24 for blowing the oxygen gas had a throat diameter of 14 mm, and the flux feeding ports 22*c* of the flux supply tube 22 for feeding the exits 24*a* of the Laval nozzles 24 with the slag-forming, powdered flux had a diameter of 9 mm. The powdered flux used contained at least one selected from the group consisting of quicklime, fluorite, dolomite and iron ore. A series of experiments were conducted for cases I to III under the conditions tabulated in Table 1 by the use of the converter having the specifications described in the above. The experimental results are tabulated in Table 2:

I. The Present Invention;

II. The prior Art (in which the slag-forming, powdered flux was premixed with the oxygen in or upstream of the oxygen supply tubes 23, i.e., in the main oxygen-blowing line); and III. The Prior Art (in which the converter was charged with the slag-forming flux in the agglomerated form).

TABLE 1

| | Refining Conditions | | | | | | | | | |
|---|---|---|---|---|---|---|---|---|---|---|
| | Components of Molten Iron (%) | | | | | Temp. of Molten | Flow Rate of Top-Blown $O_2$ | Flow Rate of Carrier Gas $O_2$ | Flow Rate of Bottom-Blown Gas Ar | Distance between Lance & Molten Iron Surface |
| | C | Si | Mn | P | S | Iron (°C.) | ($Nm^3$/Hr) | ($Nm^3$/Hr) | ($Nm^3$/Hr) | (m/m) |
| I | 4.31 | 0.52 | 0.60 | 0.130 | 0.021 | 1270 | 2200 | 200 | 200 | 1000 |
| II | 4.42 | 0.43 | 0.55 | 0.120 | 0.025 | 1250 | 2200 | 200 | 200 | 1000 |
| III | 4.28 | 0.55 | 0.52 | 0.133 | 0.019 | 1280 | 2200 | 200 | 200 | 1000 |

Remarks:

i. In all the Experiments I to III, the main material was composed of 15 tons of pig iron and 3 tons of scrap.

ii. In the Experiment II, the gas fed from the flux feeding ports 22*c* was composed of $O_2$ only, and the slag-forming, powdered flux was supplied at the oxygen supply tube 23.

iii. In the Experiments II and III, the carrier gas was fed to prevent the lance from getting clogged.

TABLE 2

| | Results of Refining Experiments | | | | | | | | |
|---|---|---|---|---|---|---|---|---|---|
| | Chemical Components Analyzed (%) | | | | | Temp. | Presence of | Total Iron (%) in | |
| | C | Si | Mn | P | S | (°C.) | Slopping | Slag | Yield |
| I | 0.51 | — | 0.32 | 0.014 | 0.016 | 1675 | No | 7.1 | +0.2 |
| II | 0.48 | — | 0.16 | 0.016 | 0.021 | 1670 | High | 23.5 | −1.0 |
| III | 0.53 | — | 0.25 | 0.041 | 0.018 | 1680 | No | 9.2 | ±0 |

From the Experimental results of Table 2, the present invention should be appreciated in that it could enjoy excellent refining effects and an improvement in the production yield. Moreover, the investigations of the Laval nozzles of the lance after the refining Experiments I and II have revealed that both the Laval nozzles and the flux feeding ports of the lance according to the present invention were little worn whereas the Laval nozzles, especially their throats, of the lance of the Experiments II according to the prior art were worn and damaged.

As has been described hereinbefore, according to the present invention, the slag-forming flux in the powdered form can be fed to the Laval nozzles just upstream of their exits so that the flux can be uniformly dispersed in the supersonic oxygen gas jets and blown at a velocity sufficient to penetrate into the molten iron. As a result, the flow rate of the carrier gas can be reduced to the minimum that can carry the powdered flux without any difficulty so that both the cost for the facilities and the running cost can be dropped and so that there arises no restriction to the facilities even in case the existing converter is to have its construction changed. Moreover, the present invention can be applied to a refining process for refining all kinds of steel that can be produced by the usual top-blowing, steel making processes, such as, carbon steel (e.g., rimmed steel or killed steel), low-alloy steel or stainless steel.

What is claimed is:

1. A lance structure to be used with a top-blown converter for blowing oxygen from the top into molten iron contained in the converter thereby to refine the molten iron into steel, comprising:

a sheath having a generally cylindrical side wall and a blinded bottom wall;

a generally cylindrical flux supply tube disposed coaxially in said sheath and having its bottom wall blinded and spaced from the bottom wall of said sheath, said flux supply tube defining a powdered flux supply passage for carrying slag-forming, powdered flux therethrough in a carrier gas and supplying the powdered flux to supersonic jets of an oxygen gas;

a generally cylindrical oxygen supply tube disposed coaxially in said sheath and around said flux supply tube and having its bottom wall blinded and spaced from the bottom wall of said sheath, said oxygen supply tube defining an annular oxygen supply passage for supplying the oxygen gas;

a plurality of Laval nozzles leading from said oxygen supply tube and disposed in the bottom wall of said oxygen supply tube substantially equi-angularly on the axis of said sheath, said Laval nozzles having their exits opening in the bottom wall of said sheath for blowing the oxygen gas in the form of the supersonic jets into the molten iron in said top-blown converter, said flux supply tube being formed with a plurality of flux feeding ports which open into said Laval nozzles just upstream of the exits thereof to feed the powdered flux together with the carrier gas to the supersonic oxygen gas jets so that the carrier gas flows may merge into the supersonic oxygen gas jets, whereby the powdered flux fed can be uniformly dispersed in the supersonic oxygen gas jets and carried by the same into the molten iron in said top-blown converter; and a water jacket formed in the space of said sheath around said oxygen supply tube and said Laval nozzles and supplied with cooling water in a circulating manner for cooling down the side and bottom walls of said sheath and the exits of said Laval nozzles.

2. A lance structure according to claim 1, wherein said Laval nozzles are three in number and are spaced by an equal angle of 120 degrees from one another.

3. A lance structure according to claim 2, wherein the flux feeding ports of said flux supply tube are three in number and open at an acute angle with respect to the directions of said supersonic oxygen gas jets and in the radially innermost positions of the diverging walls of said Laval nozzles.

4. A lance structure according to claim 1, further comprising a generally cylindrical partition disposed coaxially in said sheath around said oxygen supply tube and said Laval nozzles for allowing the cooling water to circulate in said water jacket.

5. A lance structure according to claim 1, wherein said carrier gas is oxygen.

6. A lance structure according to claim 1, wherein said powdered flux contains at least one selected from the group consisting of quicklime, fluorite, dolomite and iron ore.

7. A lance structure for blowing a mixture of oxygen and a powdered slag-forming flux from the top of a converter into molten iron contained therein, thereby to refine said molten iron into steel, comprising:

(a) a sheath having a generally cylindrical side wall and a blinded bottom wall;

(b) a generally cylindrical flux supply tube disposed coaxially in said sheath and having its bottom wall blinded and spaced from the bottom wall of said sheath, said flux supply tube defining a flux supply passage for carrying said flux therethrough in a carrier gas and supplying said flux to supersonic jets of an oxygen gas, and being connected with sources of said powdered flux and said carrier gas;

(c) a generally cylindrical oxygen supply tube disposed coaxially in said sheath and surrounding said flux supply tube and having its bottom wall blinded and spaced from said bottom wall of said sheath, said oxygen supply tube defining an annular oxygen supply passage for supplying said oxygen gas, and being connected with a source of an oxygen gas;

(d) a plurality of Laval nozzles leading from said oxygen supply tube and disposed in the bottom wall of said oxygen supply tube substantially equiangularly on the axis of said sheath, said Laval nozzles having their exits opening in the bottom wall of said sheath for blowing a supersonic jet of oxygen, and said flux supply tube being formed with a plurality of flux feeding ports which open into each said Laval nozzle just upstream of the exits thereof and in the radially innermost portions of the diverging walls of said Laval nozzles, with each said flux feeding port opening at an acute angle with respect to the directions of the corresponding supersonic oxygen gas jets so as to feed said flux and said carrier gas together to merge with said oxygen gas jet, whereby said flux is uniformly dispersed in said oxygen gas jet and is discharged from said lance structure; and (e) a water jacket formed within the space of said sheath between said sheath and said oxygen supply tube and said Laval nozzles and connected with a circulating source of cooling water for cooling the side and bottom walls of said sheath and the exits of said Laval nozzles.

8. A lance structure according to claim 7, wherein said Laval nozzles are three in number and are spaced by equal angles of 120 degrees from one another.

9. A lance structure according to claim 7, further comprising a generally cylindrical partition disposed coaxially in said sheath between said sheath and said oxygen supply tube and said Laval nozzles to define an inner water jacket and an outer water jacket, being connected with said source of cooling water such that water enters said inner jacket and returns to said source via said outer jacket.

10. A lance structure according to claim 7, wherein said carrier gas is oxygen.

11. A lance structure according to claim 7, wherein said powdered slag-forming flux contains at least one material selected from the group consisting of quicklime, fluorite, dolomite and iron ore.

12. A lance structure according to claim 7, wherein said oxygen supply tube is connected to a source of an oxygen gas at sufficient pressure to produce supersonic oxygen gas jets at the exit of each of said Laval nozzles.

* * * * *